United States Patent Office 3,594,348
Patented July 20, 1971

3,594,348

POLYETHERS CAPABLE OF BEING CROSS-LINKED UNDER THE ACTION OF LIGHT AND PROCESS FOR THEIR MANUFACTURE

Herbert Maar and Hartmut Steppan, Wiesbaden, Günter Messwarb, Kelkheim, Taunus, and Walter Lüders, Neu-Isenburg, Germany, assignors to Kalle Aktiengesellschaft, Wiesbaden-Biebrich, Germany No Drawing. Filed July 2, 1968, Ser. No. 741,877
Claims priority, application Germany, July 6, 1967, F 52,874
The portion of the term of the patent subsequent to Mar. 10, 1987, has been disclaimed
Int. Cl. C08g *23/04;* G03c *1/68, 5/00*
U.S. Cl. 260—47 20 Claims

ABSTRACT OF THE DISCLOSURE

Polyethers capable of being cross-linked under the action of light are made by cationic polymerization of light-sensitive oxetanes disubstituted in the 3-position, if desired together with substituted oxiranes, oxetanes or oxolanes as light-insensitive comonomers.

The present invention relates to a process for the manufacture of polyethers, the solubility of which is reduced or which become even insoluble under the action of ultraviolet light. The present invention also relates to the polyethers obtained by this process.

A large number of polymeric substances have been known which have light-sensitive groupings in the principal chain or in the side chains, which render then insoluble when exposed to ultra-violet radiation. Polymers capable of being cross-linked under the action of light, which are free from saponifiable bonds have already been described (cf. U.S. Pats. Nos. 2,716,097; 2,716,102; 2,716,-103; and 2,861,058), but for their manufacture prefabricated polymers must be reacted with determined low molecular weight substances to introduce the required light-sensitive groupings. This process is complicated and may be rendered even more difficult by side reactions which may occur under the reaction conditions as is, for example, the case in the Friedel Crafts reaction.

The present invention enables difficultly saponifiable polyethers which can be cross-linked under the action of light to be obtained in one process step under mild conditions while avoiding the above disadvantages.

The present invention provides a process for the manufacture of polyethers capable of being cross-linked under the action of light, which comprises polymerizing light-sensitive oxetanes, disubstituted in the 3-position of the general Formula I.

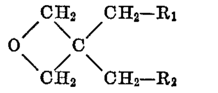

(I)

in which $R_1$ is the radical

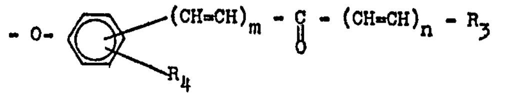

or the radical

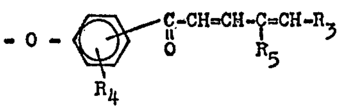

$R_2$ has the same meaning as $R_1$ or is a hydrogen atom, an alkyl or alkoxy group with 1 to 8 carbon atoms, an aryloxy group or a halogen atom, $R_3$ represents a carboxylic or heterocyclic aromatic group which is linked directly via aromatic nucleus and which may be substituted, $R_4$ stands for a hydrogen atom, an alkyl or alkoxy group or a halogen atom, $R_5$ is a chlorine atom or a phenyl group, *m* is zero or 1, and *n* is zero or 1, 2, 3 or 4, either alone or together with oxiranes, oxetanes or oxolanes which may be substituted, as light-insensitive comonomers in the presence of cationic catalysts which produce a ring opening of the cyclic ethers under the polymerization conditions.

As components for the copolymerization in accordance with the invention of the oxetanes disubstituted in the 3-position, there may be used light-insensitive cyclic ethers containing three ring members in the ring (oxiranes), or four ring members (oxetanes) or five ring members (oxolanes), advantageously propylene oxide, styrene oxide, tetrahydrofurane, 1,4-epoxycyclohexane or compounds of the following Formula II

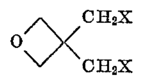

(II)

in which X is a halogen or hydrogen atom or an alkyl, alkoxy, aryloxy, cyano or acetoxy group.

In the above Formula I of the oxetanes disubstituted in the 3-position, which are to be homo- or copolymerized in accordance with the invention, $R_1$ stands for the radical

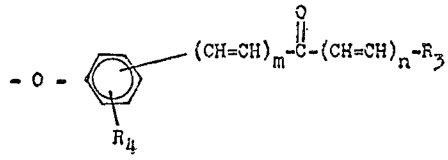

or the radical

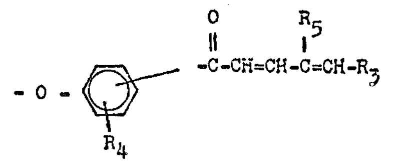

$R_2$ has the same meaning as $R_1$ or stands for a hydrogen atom, an alkyl group, preferably a methyl or ethyl group, an alkoxy group with 1 to 8 carbon atoms, advantageously 1 to 4 carbon atoms, an aryloxy group (which may be unsubstituted or may carry one or more substituents which do not interfere with the polymerization of the oxetane group, advantageously an alkyl or alkoxy group or a halogen atom; particularly advantageous radicals are phenoxy groups which may be monosubstituted by an alkyl group with 1 to 4 carbon atoms, an alkoxy group with 1 to 4 carbon atoms or a halogen atom), or a halogen atom, advantageously a chlorine or bromine atom, $R_3$ stands for a carbocyclic or heterocyclic aromatic group linked directly via the aromatic nucleus, which may be substituted, especially if $R_3$ is a carbocyclic aromatic group, for example, of the benzene, naphthalene or anthracene series, by an alkyl group with advantageously 1 to 4 carbon atoms, an alkoxy group with advantageously 1 to 4 carbon atoms, a halogen atom or a nitro group, in which case two alkoxy groups may be linked with each other by ring closure as is the case, for example, when the aromatic group is substituted by a methylene dioxy radical; $R_3$ is preferably phenyl, 4-methylphenyl, 4-isopropylphenyl, methylenedioxy-(3,4)-phenyl, 4-azidophenyl or thienyl-(2); $R_4$ represents a hydrogen atom, an alkyl or alkoxy group or a halogen atom, advantageously a hydrogen atom, a methyl or methoxy group or a chlorine atom, $R_5$ stands for a chlorine atom or a phenyl group, *m* is zero or 1 and *n* is zero or 1, 2, 3 or 4; if *m* is zero *n* is advantageously 1, 2, 3 or 4 and if *m* is 1; *n* is advantageously zero or 1.

The present invention also relates to polyethers obtained by the polymerization in accordance with the invention with ring opening of the cyclic ether groupings, which polyethers can be cross-linked under the action of light, the said polyethers having the following general formula which is not intended, however, to limit the sequence and arrangement of the monomer units in the polymer:

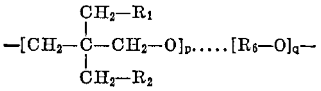

in which $R_1$ and $R_2$ have the meanings given above and $R_6$ represents the following radicals

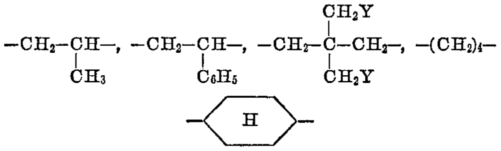

in which Y stands for a halogen atom or a cyano or acetoxy group, *p* is 1 or a number greater than 1 and *q* is zero or 1 or a number greater than 1.

As light-sensitive monomers of the above Formula I to be homo- or copolymerized by the process of the invention there may advantageously be used, for example, the following compounds:

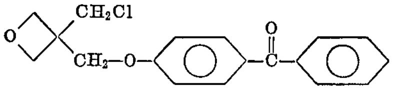

(1)

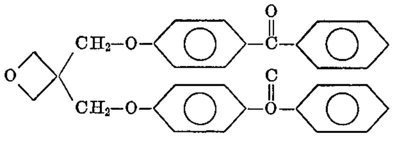

(2)

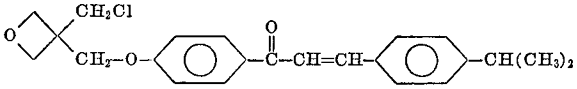

(3)

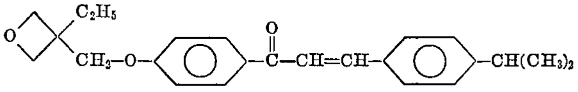

(4)

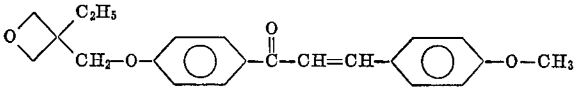

(5)

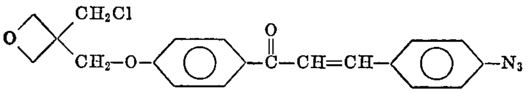

(6)

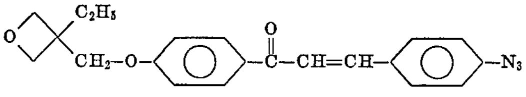

(7)

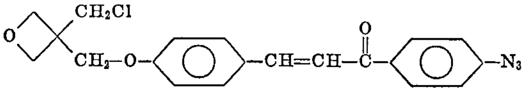

(8)

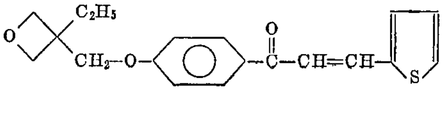

(9)

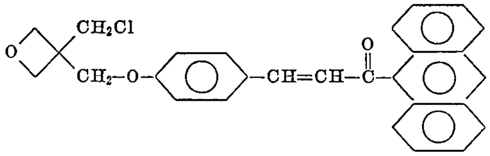

(10)

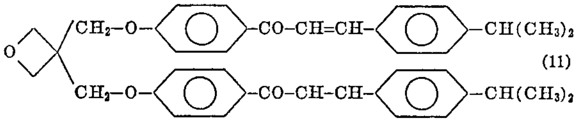

(11)

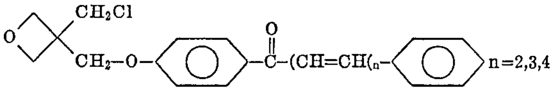

(12,13,14)

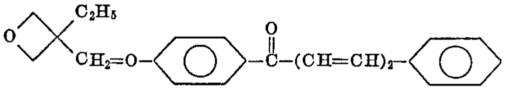

(15)

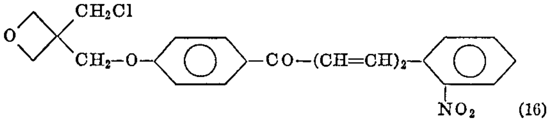

(16)

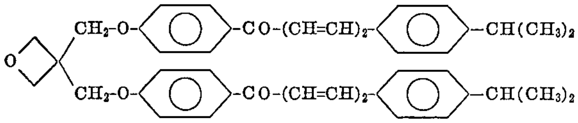

(17)

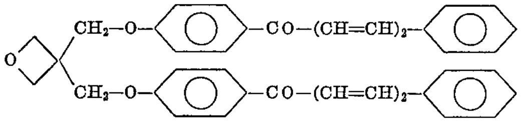

(18)

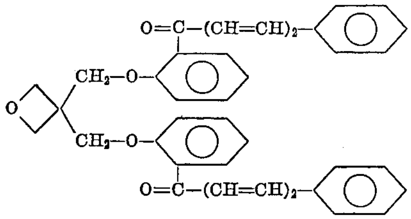

(19)

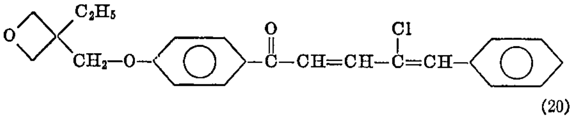

(20)

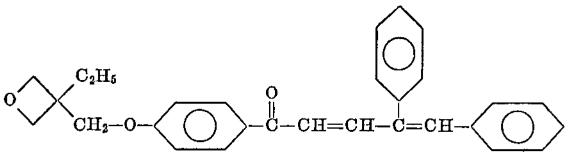

(21)

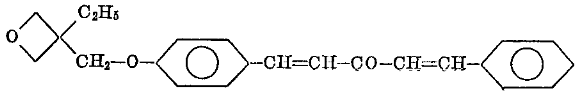

(22)

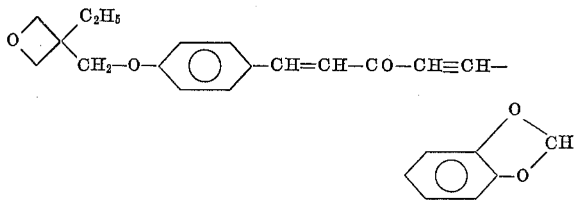

The light-sensitive compounds to be used as monomers for the homo- or copolymerization in accordance with the invention can be obtained, for example, by the process described in our U.S. patent application Ser. No. 741,864 filed concurrently herewith.

Examples of light-insensitive cyclic comonomers to be used for making the polyethers in accordance with the invention are alkylene oxides, for example, ethylene oxide, propylene oxide and butylene oxide; substituted alkylene oxides, for example, epichlorhydrin, epibromhydrin, 1,2-dichloro-3,4-epoxybutane, 1 - chloro-3,4-epoxybutane, 1-chloro-4,5-epoxypentane, 1,1-dichloro-2,3-epoxypropane, 1,1,1-trichloro-2,3-epoxypropane or 1,1,1-trichloro-3,4-epoxybutane; epoxy ethers, for example, methylglycidyl ether, isobutylglycidyl ether, tert. butylglycidyl ether, n-hexylglycidyl ether, n-octylglycidyl ether, phenylglycidyl ether, chlorophenylglycidyl ether, alkylphenylglycidyl ether or chloralkylphenylglycidyl ether; and other epoxides, for example styrene oxide.

The following cyclic ethers are preferably used as light-insensitive cyclic comonomers: propylene oxide, styrene oxide, 3,3-bis(phenoxymethyl)-oxetane, 3,3 - bis(chloromethyl)-oxetane (BCMO), 3,3-bis(iodomethyl)-oxetane (BIMO), tetrahydrofurane (THF) and 1,4-epoxycyclohexane.

The above light-sensitive and light-insensitive monomers yield very difficultly saponifiable polymers and copolymers. The process of the invention is also applicable, however, to monomers that yield less difficultly hydrolyzable polymers. As light-insensitive monomers of this type there may advantageously be used, for example,

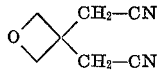
and
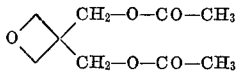

These polymers, to,o can be obtained by polymerization or copolymerization in one process step, i.e. in a particularly advantageous manner. The invention also relates to polymers which contain monomer units of the above type. Copolymers of which only the light-insensitive components and not the light-sensitive components contain readily saponifiable groupings, contain these readily hydrolyzable bonds neither in the principal chains nor in those side chains which cause cross-linking on exposure to light so that these copolymers also have a high resistance to saponification as regards the hydrolytic degradation of the principal chains or of the cross-linking chains present after exposure to light.

It is also possible to use monomers yielding less difficultly hydrolyzable polymers, for example the following:

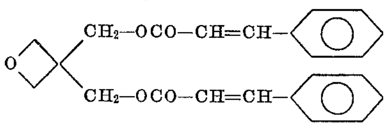

The copolymerization of the invention is not only applicable to mixtures of one light-sensitive component with one light-insensitive component but also to mixtures of one light-sensitive component with two or more different light-insensitive components or of two or more different light-sensitive components with one, two or more different light-insensitive cyclic ethers. This enables the solubility, consistency and capability of being cross-linked under the action of light of the copolymers to be varied within wide limits.

By varying the weight ratio of the reactants of the copolymerization, copolymers with different content of light-sensitive component can be obtained. The polymers can be cross-linked under the action of light if they contain at least 0.02 mol percent of bound light-sensitive monomer. The tendency of the polymers to cross-linking increases with the content of light-sensitive component. The homopolymers of the light-sensitive components are therefore particularly susceptible to photo-cross-linking.

The homo- and copolymers in accordance with the invention are by far superior to simple physical mixtures of light-insensitive polyethers and the corresponding light-sensitive monomeric oxetane derivatives with respect to the cross-linking effect brought about by light under comparable test conditions with the same action of light.

The molecular weight of the homo- and copolymers of the invention is within the range of from about 1500 to 6000, determined by the vapor pressure-osmometer method (cf. Chimica 14, 301, (1960)).

The polymers and copolymers in accordance with the invention may be obtained in various ways. The monomer mixture may be placed, for example, in the reaction vessel in bulk or in the form of a solution and then the catalyst (initiator) may be added in bulk or in the form of a solution. Alternatively, the initiator may be first placed in the reaction vessel in bulk or in the form of a solution and the monomers may then be added in admixture with one another or per se, all at the same time or one after the other, in substance or in the form of a solution. In an advantageous form of making light-sensitive polymers containing tetrahydrofurane as light-insensitive monomer by the process of the invention, the polymerization of the tetrahydrofurane is started by an appropriate initiator, for example boron fluoride etherate/epichlorohydrin and then continued by adding a solution of the light-sensitive monomer.

For the polymerization in accordance with the invention there may generally be used the catalysts (initiators) described in the literature for the polymerization of light-insensitive cyclic ethers. Advantageously, cationic polymerization initiators, for example, boron trifluoride etherate, phosphor pentafluoride and trialkyl-oxonium salts, e.g. triethyl-oxonium tetrafluoroborate, may be used. In many cases it is advantageous to add epichlorhydrin after the addition of, for example, $BF_3$ etherate to the polymerization batch to start the polymerization.

The polymerization in accordance with the invention is carried out at temperatures within the range of $-5°$ to $60°$ C., advantageously 0 to $30°$ C.

As solvents for the polymerization of the invention, organic solvents that are inert under the polymerization conditions may be used, advantageously chlorinated hydrocarbons, for example, chloroform and methylene chloride. It is also possible, however, to carry out the polymerization in the absence of a solvent in the presence of an excess amount of monomer, for example of tetrahydrofurane.

It is advantageous to carry out the polymerization reaction and the subsequent working up of the polymeric reaction products with the exclusion of daylight and to use instead yellow light, that is light from which the blue proportion has been eliminated by filters.

It is furthermore advantageous to carry out the polymerization in accordance with the invention with the exclusion of oxygen, for example, under a nitrogen atmosphere. Care must also be taken that moisture is excluded. Particulars of the polymerization conditions can be gathered from the examples below.

Owing to the mild polymerization conditions, particularly the mild reaction temperatures, the process of the invention enables also those light-sensitive oxetane derivatives to be used for the copolymerization which contain the azide group which has only a limited heat resistance. The azide containing copolymers so obtained are distinguished by a particularly pronounced tendency to cross-linking under the action of ultraviolet radiation.

The polymers in accordance with the invention can be used for many fields of application, for example the field of paints, because they can be applied from solutions in the form of thin layers and then be dried.

These films are even cross-linked under the action of diffuse daylight. There are obtained coatings which can no longer be dissolved by the solvents dissolving the uncross-linked polymer. The films are only more or less swelled by such solvents.

Before and after cross-linking under the action of light, the homo- and copolymers of the invention are distinguished by a high resistance to saponifying agents.

The following examples serve to illustrate the invention, but are not intended to limit it thereto.

In the examples, the parts are by weight (gram) unless otherwise stated (parts by volume in cc.) and the percentage figures are by weight. The tests were carried out at yellow light, that is with the proportion of blue light being eliminated by filters.

EXAMPLE 1

Copolymerization of compound 2 with tetrahydrofurane (THF)

In a three-necked flask provided with stirring means 5 parts compound 2 were dissolved under nitrogen, with the exclusion of moisture, in 5 parts absolute THF and 16 parts by volume absolute chloroform .1 part by volume boron trifluoride diethyl etherate ($BF_3$ etherate) and then 0.5 part by volume epichlorohydrin were added while cooling with ice. The whole was allowed to stand for 1 day at 4° C. in a refrigerator. Half the amounts of $BF_3$ etherate and epichlorohydrin were then again added in the same order and the reaction solution was stored for a further day at 4° C. To the moderately viscous solution so obtained about 50 parts by volume water were added and triethylamine was introduced until the colour of the solution ceased to become lighter. The chloroform and residual tetrahydrofurane were expelled by introducing steam. By drying the residue in vacuo at a temperature within the range of from 40 to 50° C. there were obtained 7.5 parts of a light almost colourless highly viscous oil which was well soluble in benzene, dioxane and tetrahydrofurane. A film obtained from a 3% solution in methylglycol/butylacetate (4:1) was insoluble in the said solvent mixture after being exposed for 10 minutes to the radiation of a 40-ampere three-phase carbon arc lamp at a distance of 110 cm.

EXAMPLE 2

Copolymerization of compound 7 with 3,3-bis(chloromethyl)oxetane (BCMO) and THF; $BF_3$ etherate/epichlorhydrin serving as initiator Under the conditions described in Example 1, 0.8 part by volume BF3 etherate was added to a solution of 4 parts compound 7, 4 parts BCMO and 2 parts by volume absolute THF in 10 parts by volume absolute chloroform, whereupon the solution became orange. When 0.4 part by volume epichlorhydrin were then added the solution became brown and solidified within a few minutes to yield a jelly. After being allowed to stand for 4 hours with cooling with ice, the jelly was taken up in methylene chloride and washed first with diluted sodium hydroxide solution and then with water. The solution was dried over $Na_2SO_4$ and evaporated at about 40° C. in a rotary evaporator in a water-jet vacuum. 9.2 parts of a yellow to light brown plastic product which was readily soluble in acetone, dioxane and acetic ester were obtained.

A film cast from a 3% solution in dioxane was already insoluble in dioxane after having been exposed for 20 to 40 seconds to the light irradiated by a 40-ampere three-phase carbon arc lamp at a distance of 110 cm.

EXAMPLE 3

Copolymerization of compound 7 with BCMO and THF; $[(C_2H_5)_3O]$ $[BF_4]$ serving as initiator 1 part triethyloxonium tetrafluoroborate was added under the conditions described in Example 1 to a solution of 3 parts compound 7 and 8 parts BCMO in 1 part by volume THF and 15 parts by volume absolute methylene chloride. The solution slowly acquired a red colour, first turning yellow. After 6 hours a further 0.6 part $$[(C_2H_5)_3O]\ [BF_4]$$

was added and after another 2 hours at 0° C. the mixture was worked up as described in Example 2. 5.7 parts of a yellow very viscous oil were obtained. The polymer was readily soluble in chloroform, dioxane, acetone and other solvents.

Films obtained from a 3% solution in methylglycol/ethyl acetate (3:2) were insoluble in the said solvent mixture after having been exposed for 40 seconds to the radiation from a 40-ampere three-phase carbon arc lamp at a distance of 110 cm.

EXAMPLE 4

Copolymerization of compound 8 with BCMO

With the exclusion of atmospheric oxygen and moisture, 5 parts of volume $BF_3$ etherate were added dropwise while stirring at 58 to 60° C. to a solution of 19.7 parts compound 8 and 24 parts BCMO in 100 parts by volume absolute chloroform. The mixture was then cooled to 19 to 20° C., while taking care that compound 8 did not crystallize out. 2.5 parts by volume epichlorhydrin were added and the solution was cooled with ice. After one and three hours, respectively, 1 part by volume $BF_3$ etherate and 0.5 part by volume epichlorhydrin were added. The red-brown viscous solution was allowed to stand for one day at 4° C., it was then diluted with about 200 parts by volume methylene chloride and finally washed with about 300 parts by volume water to which 15 parts by volume triethylamine had been added. The solution was again washed with water and dried over $Na_2O_4$. The solution was then evaporated at 35 to 40° C. in a vacuum rotary evaporator, the residue was dissolved in 35 parts by volume dioxane and the solution was added dropwise while stirring to a mixture of 100 parts by volume water, 350 parts by volume methanol and 10 parts by volume concentrated ammonia. The precipitated product was washed with water and dried at about 35° C. in a vacuum drier. 29.8 parts of a yellow to light brown plastic product which was readily soluble in dioxane and acetone were obtained.

Films obtained from a 3% solution in methyl glycol/butyl acetate (3:2) were already insoluble in acetone after being exposed for 40 seconds to the radiation from a 40-ampere three-phase carbon arc lamp at a distance of 110 cm.

EXAMPLE 5

Copolymerization of compound 11 with THF and BCMO

Under the conditions described in Example 1, 1.2 parts by volume $BF_3$ etherate and then 0.6 part by volume epichlorhydrin were added to a solution of 5 parts compound 11, 3 parts BCMO and 3 parts by volume absolute THF in 20 parts by volume absolute chloroform. The light red solution rapidly solidified to yield a jelly. After the latter had been allowed to stand for 3 days at 4° C., it was dissolved by adding about 50 parts by volume chloroform and the whole was worked up as described in Example 1. 9.8 parts of a light yellow resin were obtained which was readily soluble in dioxane, acetone and N,N-dimethylformamide (DMF).

A 3 %solution of the copolymer in methylglycol/butyl acetate (4:1) to which 10% Michler ketone (calculated on the copolymer) had been added was used for making thin films which were insoluble in the said solvent mixture after having been exposed for 6 minutes to the light irradiated by a 40-ampere three-phase carbon arc lamp at a distance of 110 cm.

EXAMPLE 6

Copolymerization of compound 9 with 1,4-epoxycyclohexane; $BF_3$ etherate/epichlorhydrin serving as initiator Under the conditions described in Example 1, 0.7 part by volume $BF_3$ etherate and then 0.35 part by volume epichlorhydrin were added to a solution of 5 parts compound 9 and 2 parts 1,4-epoxycyclohexane in 15 parts by volume absolute chloroform. This orange solution was kept for 1 day at 4° C. By working up as described in Example 1, 6 parts of a light brown brittle substance were obtained.

From a 3% solution in methylglycol/butyl acetate (3:2) containing 10% Michlers ketone (calculated on the copolymer) films could be obtained which were insoluble in the said solvent mixture after having been exposed for 5 minutes to the light irradiated by a 40-ampere three-phase carbon arc lamp at a distance of 110 cm.

EXAMPLE 7

Copolymerization of compound 9 with 1,4-epoxycyclohexane; $PF_5$ serving as initiator The polymerization batch was the same as the one described in Example 6. Instead of adding $BF_3$ etherate and epichlorhydrin, $PF_5$ gas was introduced until the blue-red colour which formed ceased to become deeper. After the reaction batch had been allowed to stand for one day at 4° C. in a refrigerator, it was worked up as described in Example 6 6.2 parts of a light brown brittle substance were obtained which was insoluble after being exposed to light under the conditions described in Example 6.

EXAMPLE 8

Copolymerization of compound 5 with propylene oxide

Under the conditions described in Example 1 a solution of 0.8 part by volume $BF_3$ etherate in 5 parts by volume absolute chloroform was added dropwise to a solution of 5 parts compound 5 and 5 parts propylene oxide in 15 parts by volume absolute chloroform. After the mixture had been allowed to stand for 2 days at 4° C., it was worked up as described in Example 1. 7.4 parts of a viscous yellowish oil were obtained which was readily soluble in acetic ester, acetone, DMF and cyclohexanone.

From a 3% solution in DMF containing 10% Michlers ketone (calculated on the copolymer), films were obtained which were insoluble in ethyl acetate after having been exposed to radiation for 5 minutes under the conditions described in the preceding examples.

EXAMPLE 9

Copolymerizable of compound 22 with BCMO

Under the conditions described in Example 1, 0.7 part by volume $BF_3$ etherate and then 0.35 part by volume epichlorhydrin were added, while stirring, to a solution of 3 parts compound 22 and 2 parts BCMO in 10 parts by volume absolute chloroform. After 5 hours the moderately viscous red-brown solution was worked up as described in Example 1. A yellow-brown resinous product was obtained.

From a 3% solution in DMF containing 10% Michlers ketone (calculated on the copolymer) films were obtained which were insoluble in DMF after having been exposed to light for 5 minutes under the conditions described in the above examples.

EXAMPLE 10

Homopolymerization of compound 15

Under the conditions described in Example 1, 1 part by volume $BF_3$ etherate and then 0.6 part by volume epichlorhydrin were added to a solution of 10 parts compound 15 in 20 parts by volume absolute chloroform. The dark red solution was allowed to stand for 4 days at 4° C. in a refrigerator whereby it became highly viscous. (When the solution was allowed to stand for 7 days it solidified to yield a jelly.) By working up as described in Example 1 there were obtained 10.1 parts of a light yellow resin which was soluble in dioxane. DMF and cyclohexanone.

Films obtained from a 3% solution in DMF were insoluble in DMF after having been exposed to light for 2 minutes as described in the preceding examples.

EXAMPLE 11

Copolymerization of compound 15 with BCMO

Under the conditions described in Example 1, 0.6 part by volume $BF_3$ etherate and then 0.3 part by volume epichlorhydrin were added to 3 parts compound 15 and 2 parts BCMO in 10 parts by volume absolute methylene chloride. The dark red solution which soon became viscous was allowed to stand for 1 day at 4° C. in a refrigerator and was then worked up as described in Example 1. 5 parts of a yellow-orange brittle resin were obtained.

From a 3% solution in methylglycol/butyl acetate (3:2) films were obtained which were insoluble in the said solvent mixture after having been exposed to light for 2 minutes under the conditions described in the preceding examples.

EXAMPLE 12

Copolymerization of compound 15 with 3,3-bis(cyanomethyl)-oxetane

Under the conditions of Example 1, 0.4 part by volume $BF_3$ etherate and then 0.2 part by volume epichlorhydrin were added to 3 parts compound 15 and 0.5 part 3,3-bis(cyanomethyl)-oxetane in 8 parts by volume absolute methylene chloride. After stirring for 2 hours, the ice cooling was withdrawn and the dark red solution was allowed to stand for 20 hours at room temperature. The highly viscous solution was diluted with methylene chloride and worked up as described in Example 1. 3.2 parts of an orange brittle resin which was soluble in dioxane, DMF and cyclohexanone were obtained.

From a 3% solution in methylglycol/butyl acetate (2:3) films were obtained which were insoluble in the said solvent mixture after having been exposed to light for 5 minutes under the conditions described in the preceding examples.

EXAMPLE 13

Copolymerization of compound 15 with THF

Under the conditions described in Example 1, 1.2 parts by volume $BF_3$ etherate and then 0.6 part by volume epichlorhydrin were added to 5 parts by volume absolute THF. The mixture was rapidly polymerized to yield a highly viscous mass. After 3 hours a solution of 10 parts compound 15 in 20 parts by volume absolute chloroform was added. After having been allowed to stand for 1 day at 4° C. in a refrigerator the viscous dark red solution was worked up as described in Example 1. 14.7 parts of a yellow to light brown resin which was soluble in DMF and cyclohexane were obtained.

Films obtained from a 3% solution in DMF were insoluble in DMF after having been exposed to light for 2 minutes under the conditions described in the preceding examples.

EXAMPLE 14

Copolymerization of compound 15 with BCMO and 3,3-bis(acetoxymethyl)-oxetane

Under the conditions described in Example 1, 0.6 part by volume $BF_3$ etherate and 0.3 part by volume epichlorhydrin were added to a solution of 3 parts compound 15, 2 parts BCMO and 1 part 3,3-bis(acetoxymethyl)-oxetane in 10 parts by volume absolute chloroform. The dark red solution was stored for 2 days at 4° C. in a refrigerator whereby the viscosity of the solution was increased. The solution was then diluted with methylene chloride. There were then added about 100 parts by volume water and such an amount of triethylamine that the organic solution turned orange. The organic phase was washed with water, dried over $Na_2SO_4$ and evaporated in a rotary evaporator. 6.1 parts of an orange, somewhat sticky mass which was readily soluble in ethyl acetate and acetone were obtained.

From a 3% solution in methylglycol/butyl acetate (2.3) films were obtained which were insoluble in acetone after having been exposed to light for 2 minutes under the conditions described in the preceding examples.

EXAMPLE 15

Copolymerization of compound 15 with THF and 3,3-bis(iodomethyl)-oxetane (BIMO)

Under the conditions described in Example 1, 0.7 part by volume $BF_3$ etherate and then 0.35 part by volume epichlorhydrin were added to a solution of 4 parts compound 15 and 1 part BIMO in 1 part by volume THF and 10 parts by volume absolute chloroform. Already after a few minutes the dark red solution solidified to yield a jelly. After having been allowed to stand for 2 hours at 0° C., the jelly was dissolved by adding chloroform and worked up as described in Example 1. There were obtained 6.05 parts of a yellow resin soluble in dioxane, cyclohexanone and DMF.

Films obtained from a DMF solution were insoluble in DMF after having been exposed to light for 2 minutes under the conditions described in the preceding examples.

EXAMPLE 16

Copolymerization of compound 20 with THF

Under the conditions described in Example 1, 0.4 part by volume $BF_3$ etherate and then 0.2 part by volume epichlorhydrin were added to a solution of 3.4 parts compound 20 in 1.7 parts by volume absolute THF and 10 parts by volume absolute chloroform. After stirring for 6 hours while cooling with ice, half the amounts of $BF_3$ etherate and epichlorhydrin were again added. By working up as described in Example 1 there were obtained 4.0 parts of a brownish rubber-like mass which was soluble in DMF, dioxane and cyclohexanone.

Films obtained from a 3% solution in DMF were insoluble in DMF after having been exposed to light for 2 minutes under the conditions described in the preceding examples.

EXAMPLE 17

Copolymerization of compound 19 with BCMO

Under the conditions described in Example 1, 0.7 part by volume $BF_3$ etherate and 0.35 part by volume epichlorhydrin were added to a solution of 5 parts compound 19 and 2 parts BCMO in 15 parts by volume absolute chloroform. After 2 hours, a further 0.35 part by volume $BF_3$ etherate and 0.18 part by volume epichlorhydrin was added. After having been allowed to stand for 1 day at 4° C. in a refrigerator, the solution was worked up as described in Example 1. 6.4 parts of a yellow-brown resin-like substance which was soluble in dioxane and cyclohexanone were obtained.

Films obtained from a 3% solution in methylglycol/butyl acetate (2:3) were insoluble in the said solvent mixture after having been exposed to light for 5 minutes under the conditions described in the preceding examples.

EXAMPLE 18

Copolymerization of compound 13 with THF

Under the conditions described in Example 1, 0.3 part by volume $BF_3$ etherate and then 0.15 part by volume epichlorhydrin were added at room temperature to a solution of 1 part compound 13 in 10 parts by volume absolute THF. After 1 hours $BF_3$ etherate and epichlorhydrin were again added in the same amounts. The dark red viscous solution was stored for 1 day at 4° C. in a refrigerator and worked up as described in Example 1, while adding 0.05 part 2,6-di-tert.butyl-4-methyl-phenol to the reaction mixture before the distillation with steam to prevent autoxidative cross-linking. 6.8 parts of a yellow-orange, somewhat sticky resin which was readily soluble in ethyl acetate, dioxane and cyclohexanone were obtained.

From a 3% solution in cyclohexanone films were obtained which were insoluble in ethyl acetate after being exposed to light for 2 minutes under the conditions described in the preceding examples.

EXAMPLE 19

Homopolymerization of compound 4

Under the conditions described in Example 1, 1 part by volume $BF_3$ etherate and then 0.5 part by volume epichlorhydrin were added to a solution of 5 parts compound 4 in 12 cc. absolute methylene chloride. The viscosity of the solution increased rapidly. After 40 minutes the solution was worked up as described in Example 1. 4.92 parts of a light yellow brittle resin which was readily soluble in n-butyl acetate and acetone were obtained.

From a 2% solution in methylglycol/butyl acetate (2:3) containing 10% Michlers ketone (calculated on the polymer) thin films were obtained which were insoluble in the said solvent mixture after being exposed to light for 5 minutes under the conditions described in the preceding examples.

EXAMPLE 20

Homopolymerization of compound 12

Under the conditions described in Example 1, 4 parts by volume $BF_3$ etherate were added to a solution of 40 parts compound 12 in 80 parts by volume absolute chloroform. 2 parts by volume epichlorhydrin were then added dropwise. After the mixture had been allowed to stand for 1 day at room temperature 1 part by volume $BF_3$ etherate and 0.5 part by volume epichlorhydrin were added. After 2 hours the viscous solution was diluted with 100 parts by volume methylene chloride and, after the addition of 10 parts by volume triethylamine and 10 parts by volume concentrated ammonia, chloroform and methylene chloride were expelled by steam distillation. The residue was dissolved in a mixture of 80 parts by volume DMF and 80 parts by volume dioxane and reprecipitated by adding it dropwise to 500 parts by volume of vigorously stirred methanol. The product was boiled with water and dried at 70° C. in vacuo, whereby 31 grams of a yellow powder were obtained.

From a 3% solution in methylglycol/butyl acetate (2:3) films were obtained which were insoluble in the said solvent mixture after having been exposed to light under the conditions described in the preceding examples.

What is claimed is:

1. Light-sensitive polyether polymers of a molecular weight of at least 1500 containing structural units of the general formula

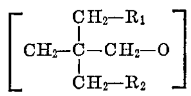

in which $R_1$ stands for the radical

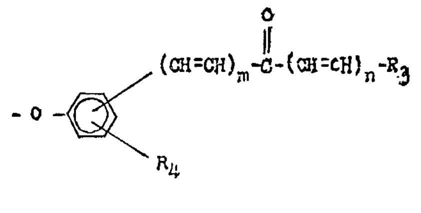

or the radical

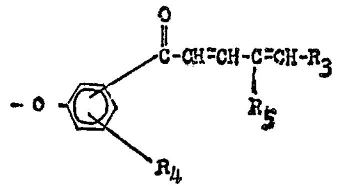

$R_2$ has the same meaning as $R_1$ or is a hydrogen atom, an alkyl or alkoxy group with 1 to 8 carbon atoms, an aryloxy group or a halogen atom, $R_3$ is a thienyl radical or an aromatic radical which may be substituted with an alkyl, alkoxy, azide or nitro group, said radicals being linked directly via their nuclei, $R_4$ is hydrogen, chlorine, an alkyl or alkoxy group, $R_5$ is chlorine or phenyl, *m* is zero or 1, and *n* is 0 to 4.

2. Light-sensitive polyether polymers having a molecular weight of at least 1500 containing structural units of the general formula $$-\left[\begin{array}{c} CH_2-R_1 \\ | \\ CH_2-C-CH_2-O \\ | \\ CH_2-R_2 \end{array}\right]_p \ldots [R_6-O]_q-$$

in which $R_1$ stands for the radical

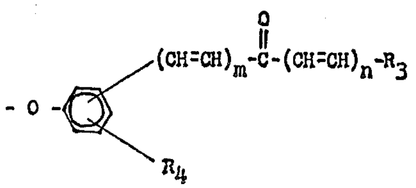

or the radical

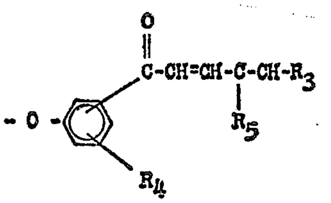

$R_2$ has the same meaning as $R_1$ or is a hydrogen atom, an alkyl or alkoxy group with 1 to 8 carbon atoms, an aryloxy group or a halogen atom, $R_3$ is a thienyl radical or an aromatic radical which may be substituted with an alkyl, alkoxy, azide or nitro group, said radicals being linked directly via their nuclei, $R_4$ is hydrogen, chlorine or an alkyl or alkoxy group, $R_5$ is chlorine or phenyl, *m* is zero or 1, and *n* is 0 to 4, *p* is 1 or a number greater than 1, $R_6$ is one of the following radicals $-CH_2-CH(CH_3)-$, $-CH_2-CH(C_6H_5)-$, $-CH_2-C(CH_2Y)_2-CH_2-$, $-(CH_2)_4-$ or

in which Y stands for a halogen atom or a cyano or acetoxy group, and *q* is 1 or a number greater than 1.

3. A polyether polymer according to claim 1 wherein said structural units are derived from the compound:

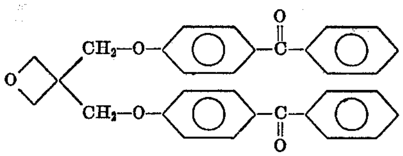

4. A polyether polymer according to claim 1 wherein said structural units are derived from the compound:

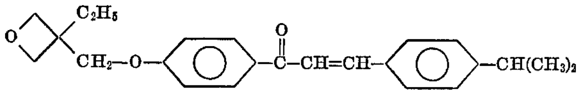

5. A polyether polymer according to claim 1 where said structural units are derived from the compound:

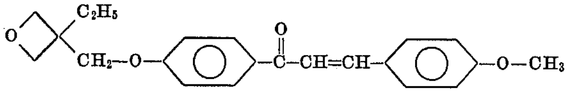

6. A polyether polymer according to claim 1 wherein said structural units are derived from the compound:

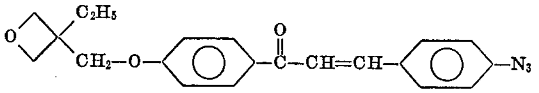

7. A polyether polymer according to claim 1 wherein said structural units are derived from the compound:

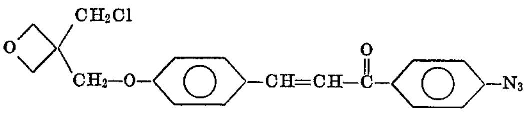

8. A polyether polymer according to claim 1 wherein said structural units are derived from the compound:

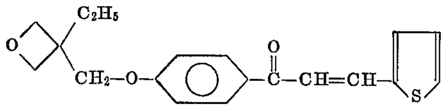

9. A polyether polymer according to claim 1 wherein said structural units are derived from the compound:

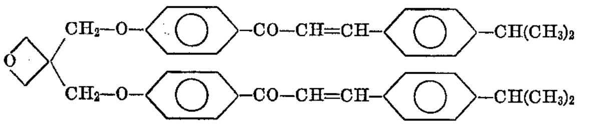

10. A polyether polymer according to claim 1 wherein said structural units are derived from the compound:

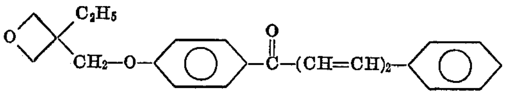

11. A polyether polymer according to claim 1 wherein said structural units are derived from the compound:

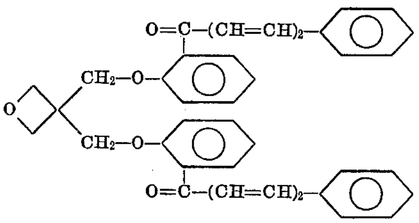

12. A polyether polymer according to claim 1 wherein said structural units are derived from the compound:

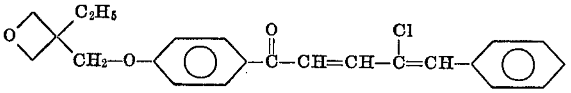

13. A polyether polymer according to claim 1 wherein said structural units are derived from the compound:

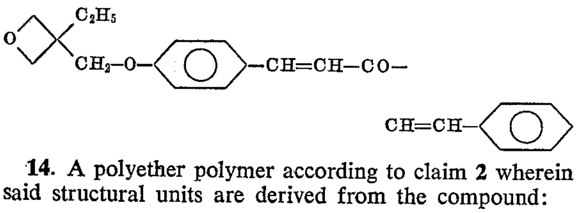

14. A polyether polymer according to claim 2 wherein said structural units are derived from the compound:

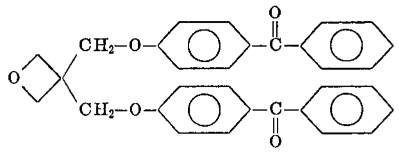

15. A polyether polymer according to claim 2 wherein said structural units are derived from the compound:

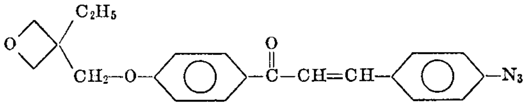

16. A polyether polymer according to claim 2 wherein said structural units are derived from the compound:

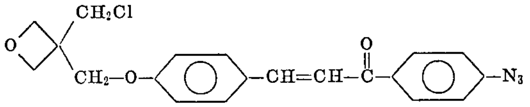

17. A polyether polymer according to claim 2 wherein said structural units are derived from the compound:

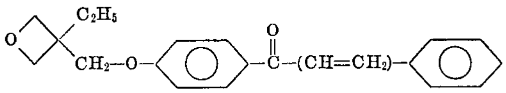

18. A polyether polymer according to claim 2 wherein said structural units are derived from the compound:

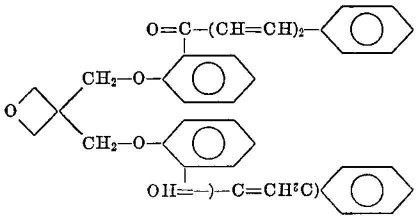

19. A polyether polymer according to claim 2 wherein said structural units are derived from the compound:

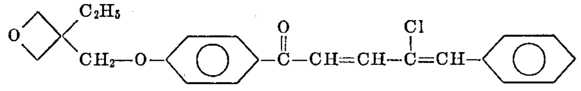

20. A polyether polymer according to claim 2 wherein said structural units are derived from the compound:

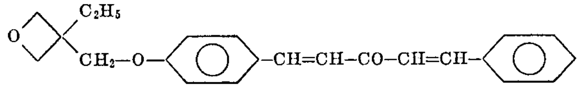

References Cited

UNITED STATES PATENTS

| | | | |
|---|---|---|---|
| 2,708,665 | 5/1955 | Unruh | 260—93.5 |
| 3,259,590 | 7/1966 | Weissermel | 260—2 |
| 3,499,759 | 3/1970 | Maar | 96—35.1 |

FOREIGN PATENTS

| | | | |
|---|---|---|---|
| 758,450 | 10/1956 | Great Britain | 260—2 |

OTHER REFERENCES

Farthing, A. C.: Chem. Soc. Journal, pt. 4, p. 3653 (1955).

JACOB L. SCHOFER, Primary Examiner

C. A. HENDERSON, Jr., Assistant Examiner

U.S. Cl. X.R.

96—35.1, 115; 204—159.14; 260—2, 63, 332.3, 333, 590